Patented Aug. 22, 1933

1,923,245

UNITED STATES PATENT OFFICE 1,923,245

NONSHATTERABLE GLASS AND METHOD OF MAKING SAME

Michael J. Walsh, San Diego, Calif., assignor to Kelco Company, Los Angeles, Calif., a Corporation of Delaware No Drawing. Application December 7, 1929
Serial No. 412,561

7 Claims. (Cl. 49—81)

This invention is an improvement in the art of so-called non-shatterable glass, such glass ordinarily comprising two sheets of glass united by an interposed layer of transparent material which bonds the glass sheets and will prevent shattering of the glass if broken or cracked. There have been many attempts to produce a non-shatterable glass, some of which have proved failures, and others have produced more or less satisfactory results. Great trouble has been heretofore experienced in making non-shatterable glass because of defects in the bonding medium, or in the joints between the bonding medium and the glass, and by reason of the tendency of the bonding medium to discolor and thus impair the clarity of the glass, and various other practical objections have developed.

The object of my present invention is to produce a novel non-shatterable glass comprising sheets of glass united by an interposed transparent film or layer of alginic acid or other alginate and hermetically sealed at the edges of the laminations. The product is a non-shatterable transparent glass which will not darken on prolonged exposure to sunlight. The invention further includes a novel method of producing such glass. To enable others to adopt and use the invention and produce the novel product I will explain the method of making such glass and the product therof; and summarize in the claims the method and the product for which I desire protection.

In my novel non-shatterable glass I employ as the bonding medium or layer an alginate film. For this purpose sodium alginate, potassium alginate, or ammonium alginate, may be used where a clear colorless transparent glass is desired. If a colored glass or film is desired copper ammonium alginate may be used. These alginates may be produced by the processes and methods set forth in the co-pending application of Thornley and Walsh filed August 6, 1927, Serial No. 211,192 which insures production of good alginates, but the invention is not limted to alginates produced by the methods described in the aforesaid application, as alginates produced by other processes may be employed.

In producing my non-shatterable glass one surface of each glass sheet is first coated or covered with a film of alginate which is dried thereupon. The coated glass sheets are then brought together with their film coated faces in contact, and are pressed together under sufficient pressure temperature and time to cause the films to unite or merge into one layer. A triplex sheet is thus obtained consisting of two exterior layers of glass and an intervening bonding layer of alginate film. The edges of the laminated triplex sheets may be sealed by any suitable means, such as a water-proof cement. The resulting laminated glass is transparent, shatter-proof, and will not be darkened in color by prolonged exposure to sunlight.

In the process of making the aforesaid non-shatterable glass I may for example use sodium alginate for the bonding film or layer. In such process a solution of sodium alginate containing 6% of sodium alginate solids and having a viscosity of 200 seconds, as determined by the Woolwich viscosimeter, is prepared and allowed to stand until free from air bubbles. The solution is then poured uniformly over the surface of a sheet of glass which surface has been previously thoroughly cleaned so that it is free from all grease and dirt, etc. The glass plate should be in a true horizontal position when the solution is poured thereon. Owing to the high viscosity of the alginate solution a layer or film of the solution approximately one hundredth of an inch in thickness will adhere to the glass.

The glass with the adhering alginate solution may then be immersed for a period of approximately five minutes in a coagulating bath preferably comprising a mixture of approximately $2\frac{1}{2}\%$ calcium chloride, 5% hydrochloric acid and $92\frac{1}{2}\%$ water. In this way an insoluble film of acid calcium alginate is formed on the glass.

After the said insoluble film is formed the glass is washed to free the film from soluble salts. The washing is preferably effected by placing the film coated glass in a bath of running water and keeping it there until it is free from the salts. The coated glass is then given a final washing in a bath of water which contains about 5% of pure glycerin.

The glass with the adhering wet insoluble alginate film is then carefully heated at low temperature, not exceeding 50° C., until the film is dry.

To form my non-shatterable glass, two sheets of glass each having a surface coated with an alginate film, as described, are brought together with their film coated faces in contact. Before bringing them into contact the alginate film on each sheet of glass is preferably brushed lightly with a solution of sodium carbonate. The glass sheets are then brought together and firmly pressed so that alginate films unite into one film and securely bond the glass sheets. A triplex plate is thus obtained consisting of two layers of glass and an intermediate bonding layer of alginate film. The edges of this laminated plate may be sealed with any suitable water proofing cement.

If it is desired to produce a thicker alginic bonding layer, for instance of a thickness of twenty thousandths of an inch, a series of wet alginate films may be built up on each sheet of glass and dried out successively or simultaneously. In some cases the step of coagulating the film might be omitted and an alginate layer or film applied to and dried on the glass without subjecting it to the coagulating bath above described.

If desired a solution of soluble alginate, such as sodium alginate, may be applied directly on the surface of the glass and dried thereon without undergoing the process of coagulation. Then two sheets of such glass each having an adhering layer of dried sodium alginate film are taken; the filmed faces are slightly moistened with water and the sheets pressed together with the films in contact and the films will unite to form a single bonding layer; the resulting product being a laminated non-shatterable glass, consisting of a continuous transparent intervening film of sodium alginate between and bonding together two sheets of glass.

The edges of the laminated non-shatterable glass produced by this process should be sealed with any suitable substance, such as water proof cement, which will prevent moisture or the atmosphere penetrating the alginate film between the glass sheet. Such sodium alginate film is soluble, but as it is sealed within the triplex glass it is not exposed to weather conditions and there is, therefore, no danger of it becoming dissolved by water or water vapor.

In some cases a film or layer of sodium alginate, or other soluble alginate, of the desired thickness may be first made and subsequently applied to and between the sheets of glass; in such case the prepared alginate film should be moistened with water on both sides and then interposed between two sheets of glass and subjected to sufficient pressure to cause them to inseparably unite as above stated.

Where the alginate film is prepared apart from the glass sheets as last mentioned, it could be interposed continuously between two sheets of glass and compressed by being passed through a series of rolls, or by other suitable means to insure bonding of the glass plates to and by the interposed alginate film.

I claim:

1. The method of forming a non-shatterable glass, consisting in forming a solution of alginic acid or alginate, applying the solution to the surface of a sheet of glass to form a film thereon, coagulating the film, washing the film on the sheet to remove soluble salts therefrom, drying the wet insoluble film adhering to the sheet; assembling two such coated sheets with their films in contact, and pressing the sheets together to cause the films to unite in one layer and bond the sheets together.

2. In the process as set forth in claim 1, increasing the thickness of the bonding layer by superimposing a plurality of such alginate films on the surface of the sheet before assembling same.

3. The method of forming a non-shatterable glass, consisting in forming a solution of alginic acid or alginates and allowing the same to stand until free from air bubbles; applying the solution uniformly to the surface of a glass sheet to form a film of alginate solution thereon; coagulating the film; washing the film on the sheet in water baths to remove soluble salts therefrom, at least one of the baths containing a small percent of glycerin; drying the wet insoluble film adhering to the sheet; assembling two such coated sheets with their films in contact, and pressing the sheets together to cause the films to unite in one layer and bond the sheets together.

4. In the process as set forth in claim 3, increasing the thickness of the bonding layer by building up a plurality of superimposed alginate films on the surface of the sheet before assembling.

5. The method of forming non-shatterable glass, consisting in forming a solution of alginic acid or alginate allowing the same to stand until free from air bubbles, then pouring the solution uniformly over the surface of a sheet of glass previously cleansed to form a layer or film thereon; subjecting the film to a coagulating bath to form an insoluble film of calcium alginate on the sheet; washing the insoluble film on the sheet to remove soluble salts therefrom; drying the wet insoluble film adhering to the sheet at a low temperature; placing two such coated sheets together with the films in contact and pressing the sheets together to cause the films to unite and securely bond the sheets together.

6. The method of forming non-shatterable glass, consisting in forming a solution of alginates, allowing the same to stand until free from air bubbles, then pouring the solution uniformly over the surface of a sheet of glass previously cleansed to form a layer or film thereon, subjecting the film to a coagulating bath to form an insoluble film of calcium alginate on the sheet, washing the insoluble film on the sheets in a plurality of baths to remove soluble salts therefrom, at least one of the baths containing a small percent of glycerin; drying the wet insoluble film adhering to the sheet, placing two such coated sheets together with the films in contact and pressing the sheets together to cause the films to unite and securely bond the sheets together.

7. In the process as set forth in claim 6 increasing the thickness of the bonding layer by superimposing a plurality of alginate films on the surface of the sheets before assembling.

MICHAEL JOSEPH WALSH.